United States Patent Office 3,755,579
Patented Aug. 28, 1973

---

3,755,579
2,3-DIHYDRO-1H-PYRIDO[2,3-b][1,4]THIAZIN-2-ONE AS AN ANTI-SECRETORY AGENT
Claude Gaston Biava, Deerfield, and Kao Hwang, Highland Park, Ill., assignors to Abbott Laboratories, North Chicago, Ill.
No Drawing. Filed Sept. 23, 1971, Ser. No. 183,232
Int. Cl. A61k 27/00
U.S. Cl. 424—246      1 Claim

ABSTRACT OF THE DISCLOSURE

A method of treating peptic ulcers by reducing the rate of gastric secretions using 2,3-dihydro-1H-pyrido[2,3-b][1,4]thiazin-2-one as the anti-secretory agent.

DETAILED DESCRIPTION OF THE INVENTION

This invention relates to a method of treating peptic ulcers, and more specifically relates to a method of treating ulcer patients by administering an anti-secretory agent, 2,3-dihydro-1H-pyrido[2,3-b][1,4]thiazin-2-one.

Peptic ulcers are classically treated through the use of antacids, anticholinergic agents and controlled diet. While the antacids provide relief, they are usually taken in dosages which do not effectively alter the pH of the gastric contents, and, since they enhance stomach emptying, their duration of action is shortened by their rapid removal from the stomach. The anticholinergics reduce gastirc secretion by blocking the parasympathetic stimuli to the stomach. However, these agents also block the parasympathetic stimuli to many other organs, e.g., the eye, heart, bladder, etc. This additional blocking is often manifested by undesirable side effects such as blurred vision, urinary retention, and the like. Thus, the search for improved agents for treating peptic ulcers continues.

One class of compounds which is useful in the treatment of peptic ulcers are the anti-secretory agents. Such compounds reduce the volume and acidity of gastric secretion through mechanisms other than the blockage of the cholinergic system. The present invention provides such a compound.

The compound useful in the practice of this invention, 2,3 - dihydro - 1H-pyrido[2,3-b][1,4]thiazin-2-one, is represented by the formula

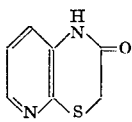

The preparation of the compound is disclosed in U.S. Pat. No. 3,546,220. The compound has been reported to possess anti-inflammatory activity which has been demonstrated in both humans and animals.

It has now unexpectedly been found that 2,3-dihydro-1H-pyrido[2,3-b][1,4]thiazin-2-one exhibits anti-secretory activity in test animals and is thus additionally useful for reducing the acidity and pepsin in the gastric secretions when administered to mammals in dosages of from 11 to 14 mg./kg. of body weight daily.

The anti-secretory activity of 2,3-dihydro-1H-pyrido-[2,3-b][1,4]thiazin-2-one was first established in dogs treated at dose levels of 80 and 160 mg./kg./day. Measurements of acidity (pH) of gastric juice after histamine stimulatis were made in control and tested dogs. Samples of gastric juice were collected 15, 30, 45, 60, 90 and 120 minutes after histamine injection (0.1 mg./kg. subcutaneously). In control dogs (4 animals) the mean gastric pH value fell from 6.4 to 1.5 in 30 minutes while in dogs treated with 80 mg./kg. (4 animals) and 160 mg./kg. (3 animals) the gastric pH values remained relatively unchanged after histamine injection.

The anti-secretory activity of 2,3-dihydro-1H-pyrido-[2,3-b][1,4]thiazin-2-one was confirmed using the modified pylorus-ligated rat technique. [Shay et al., Gastroenterology, 26, 906 (1954), and Meyet et al., J. Med. Chem., 8, 515 (1965)]. Results are expressed as the dose necessary to reduce the parameters of volume, acid output and pepsin 50% ($ED_{50}$). The effects of the compound useful in the practice of this invention were measured in three parameters with the following results:

| Parameter: | $ED_{50}$ (mg./kg.) |
|---|---|
| Volume | 14.8 |
| Acid output | 12.7 |
| Pepsin | 10.0 |

In the practice of this invention, 2,3-dihydro-1H-pyrido-[2,3-b][1,4]thiazin-2-one is administered to peptic ulcer patients in dosages of from 11 to 14 mg./kg. of body weight daily. It is presently thought that doses of 10 to 20 mg. three or four times daily is the preferred dosage regimen.

While the compound can be administered alone, that is, as the sole component in a filled capsule, it is preferred to formulate the compound in various dosage forms for oral administration such as tablets, syrups, and the like. Such dosage forms are prepared by methods well known in the art and generally include a pharmaceutically acceptable carrier or diluent such as lactose, starch or sucrose along with lubricating agents such as magnesium stearate, and flavoring and sweetening agents and the like.

We claim:
1. A method of inhibiting gastric secretion in a peptic ulcer patient in need of such treatment comprising orally administering an anti-secretory effective amount of 2,3-dihydro-1H-pyrido[2,3-b][1,4]thiazin-2-one to said patient.

References Cited
UNITED STATES PATENTS
3,546,220   12/1970   Stein et al. _____ 260—243

ALBERT T. MEYERS, Primary Examiner
F. E. WADDELL, Assistant Examiner

UNITED STATES PATENT OFFICE
Certificate

Patent No. 3,755,579            Patented August 28, 1973

Claude Gaston Biava and Kao Hwang

Application having been made by Claude Gaston Biava and Kao Hwang, the inventors named in the patent above identified, and Abbott Laboratories, North Chicago, Illinois, a corporation of Illinois, the assignee, for the issuance of a certificate under the provisions of Title 35, Section 256, of the United States Code, adding the name of Sait Tekeli as a joint inventor, and a showing and proof of facts satisfying the requirements of the said section having been submitted, it is this 19th day of November 1974, certified that the name of said Sait Tekeli is hereby added to the said patent as a joint inventor with said Claude Gaston Biava and Kao Hwang.

FRED W. SHERLING
*Associate Solicitor.*